United States Patent
Schroeder et al.

(10) Patent No.: US 10,088,337 B2
(45) Date of Patent: Oct. 2, 2018

(54) DEVICE FOR DETECTING THE AXIAL POSITION OF A ROTOR SHAFT AND ITS APPLICATION TO A ROTARY MACHINE

(71) Applicant: SKF Magnetic Mechatronics, Saint-Marcel (FR)

(72) Inventors: Ulrich Schroeder, Mont-Saint-Aignan (FR); Eduardo Carrasco, Saint Etienne sous Bailleul (FR)

(73) Assignee: SKF MAGNETIC MECHATRONICS, Saint-Marcel (FR)

( * ) Notice: Subject to any disclaimer, the term of this patent is extended or adjusted under 35 U.S.C. 154(b) by 0 days.

(21) Appl. No.: 15/349,215

(22) Filed: Nov. 11, 2016

(65) Prior Publication Data
US 2017/0167894 A1    Jun. 15, 2017

(30) Foreign Application Priority Data
Dec. 10, 2015 (EP) .................... 15306968

(51) Int. Cl.
| | | |
|---|---|---|
| G01D 5/20 | (2006.01) | |
| G01B 7/00 | (2006.01) | |
| H02K 7/09 | (2006.01) | |
| H02K 11/225 | (2016.01) | |
| F16C 32/04 | (2006.01) | |
| F16C 41/00 | (2006.01) | |

(52) U.S. Cl.
CPC ........... G01D 5/20 (2013.01); F16C 32/0406 (2013.01); F16C 41/007 (2013.01); G01B 7/003 (2013.01); H02K 7/09 (2013.01); H02K 11/225 (2016.01)

(58) Field of Classification Search
CPC ...... F16C 32/0406; F16C 41/007; G01D 5/20
USPC ..................................................... 324/207.24
See application file for complete search history.

(56) References Cited

U.S. PATENT DOCUMENTS

| | | | | |
|---|---|---|---|---|
| 5,743,143 A | * | 4/1998 | Carpenter ............... | F16H 59/70 324/207.16 |
| 2011/0234033 A1 | | 9/2011 | Filatov et al. | |
| 2012/0263577 A1 | * | 10/2012 | Schroeder ............. | F04D 27/001 415/118 |

FOREIGN PATENT DOCUMENTS

| | | |
|---|---|---|
| EP | 0880653 A1 | 12/1998 |
| EP | 2511665 A1 | 10/2012 |

* cited by examiner

*Primary Examiner* — Jay Patidar
(74) *Attorney, Agent, or Firm* — Bryan Peckjian; SKF USA Inc. Patent Dept.

(57) ABSTRACT

A device for detecting the axial position of a rotor shaft of a rotary machine having a stator and a rotor is provided. The detecting device includes a sensor stator ring, secured to the stator, made from ferromagnetic material, facing the shoulder of one end of the hollow or not hollow rotor shaft and arranged so as to leave an axial airgap with the one end of the rotor shaft. The sensor stator ring having at least one annular slot receiving an annular induction coil. The rotor shaft is made from solid magnetic steel, an outer end of the rotor shaft acts as a target surface whose axial position is to be measured by the sensor stator ring.

9 Claims, 3 Drawing Sheets

DEVICE FOR DETECTING THE AXIAL POSITION OF A ROTOR SHAFT AND ITS APPLICATION TO A ROTARY MACHINE

CROSS REFERENCE TO RELATED APPLICATIONS

This application claims priority to European patent application no. 15306968.7 filed on Dec. 10, 2015, the contents of which are fully incorporated herein by reference.

FIELD OF THE INVENTION

The present invention relates to the field of rotary machines comprising magnetic bearings for supporting the weight and load of a rotor of the rotary machine by active magnetic bearings thanks to magnetic fields.

BACKGROUND OF THE INVENTION

In particular, the invention relates to a device for detecting the axial position of the rotor shaft of the rotary machine.

There are various types of inductive sensors. Some are based on inductance variation measurements; some are based on eddy currents.

It is known to provide a device for detecting the axial position of the center of a rotor shaft having a target of ferromagnetic material secured at one end of the rotor shaft, an induction coil associated with a stationary magnetic circuit secured to the stator of the rotary machine and placed facing the target while leaving an airgap, and a power supply circuit for powering the induction coil.

Referenced can be made to document EP 2 511 665 which describes a device for detecting the axial position of the center of a rotor shaft comprising a target of ferromagnetic material secured to one end of the rotor shaft.

However, such device is not compatible with a hollow rotor shaft used in application where it is necessary to access the center of the shaft, or at least the center of one end of the rotor shaft. It is also not compatible for application in which the center of the shaft end is used to attach a tool or a turbine wheel.

Furthermore, such device uses a specific target, which increases the cost and the complexity of the detecting device.

In case of a rotor shaft having its center not available, a solution could be to sense the axial position of a shoulder of the rotor shaft, projecting radially towards the stator, or to sense an axial reluctance variation. Such punctual sensing solutions are not satisfactory for large rotor diameter. Furthermore, rotational harmonics may appear on the sensor signal, which may generate vibrations.

The aim of the present invention is to provide a device for detecting the axial position of a rotor shaft shoulder of a rotary machine, without using any specific target.

BRIEF SUMMARY OF THE INVENTION

It is a particular object of the present invention to provide a device for detecting the axial position of a rotor shaft of a rotary machine having a stator and a rotor having a rotational axis.

The detecting device provides a sensor stator ring secured to the stator, made from ferromagnetic material, facing one end of the rotor shaft and arranged in a stationary manner so as to leave an axial airgap with the one end of the rotor shaft shoulder. The sensor stator ring provides at least one annular slot receiving an annular induction coil.

The rotor shaft is made from solid magnetic steel, such that the shoulder of the rotor shaft acts as a target surface whose axial position is to be measured by the sensor stator ring. The sensor stator ring can thus directly sense the axial position of the rotor shaft, without using any additional target. The sensor stator ring acts as a magnetic circuit and is secured to the stator.

In one embodiment, the sensor stator ring provides at least two parallel annular slots, located on the same radial plane and each receiving an annular induction coil, the annular induction coil being electrically connected in series and wound in opposite direction.

Thanks to the two coils, the magnetic excitation flux is concentrated towards the target surface of the rotor shaft.

In one embodiment, the detecting device provides an electrical circuit for powering the induction coils, the electrical circuit comprising a first AC voltage source connected to a first end of the set of coils connected in series, and at a point located at a reference voltage, and a capacitor connected in parallel to the set of coils, to the first and second end of the set of coils, and an AC current detector device arranged between the second end of the set of coils and the reference voltage adapted to deliver information about the magnitude of the current flowing between the second end of the set of coils with the parallel capacitor and the reference voltage. The information represents the value of a modification in the length of the airgap.

In one embodiment, the electrical circuit provides a second AC voltage source and a first resistor connected in series on a line connected in parallel to the AC current detector device. The second AC voltage source and the first resistor allow compensating the resulting resistive current due to the rotor target losses.

The reference voltage source is, for example, the ground.

The sensor stator ring can be made from compressed iron powder, or compressed ferrite material.

The rotor shaft can be made from standard, solid magnetic steel.

According to another aspect, the invention relates to a rotary machine comprising a stator, a rotor having at least one rotor shaft rotating around a vertical axis and supported in the stator by at least two radial magnetic bearings, and a device for detecting the axial position of the rotor shaft as described above.

In one embodiment, the rotary machine provides an axial actuator secured to the stator and configured to produce an axial attractive force on a shoulder of the rotor projecting radially towards the stator.

In one embodiment, the rotary machine further provides upper radial touch down bearing and lower radial and axial touch down bearings.

BRIEF DESCRIPTION OF THE SEVERAL VIEWS OF THE DRAWING

The present invention and its advantages will be better understood by studying the detailed description of specific embodiments given by way of non-limiting examples and illustrated by the appended drawings on which.

DETAILED DESCRIPTION OF THE INVENTION

Figure 1:
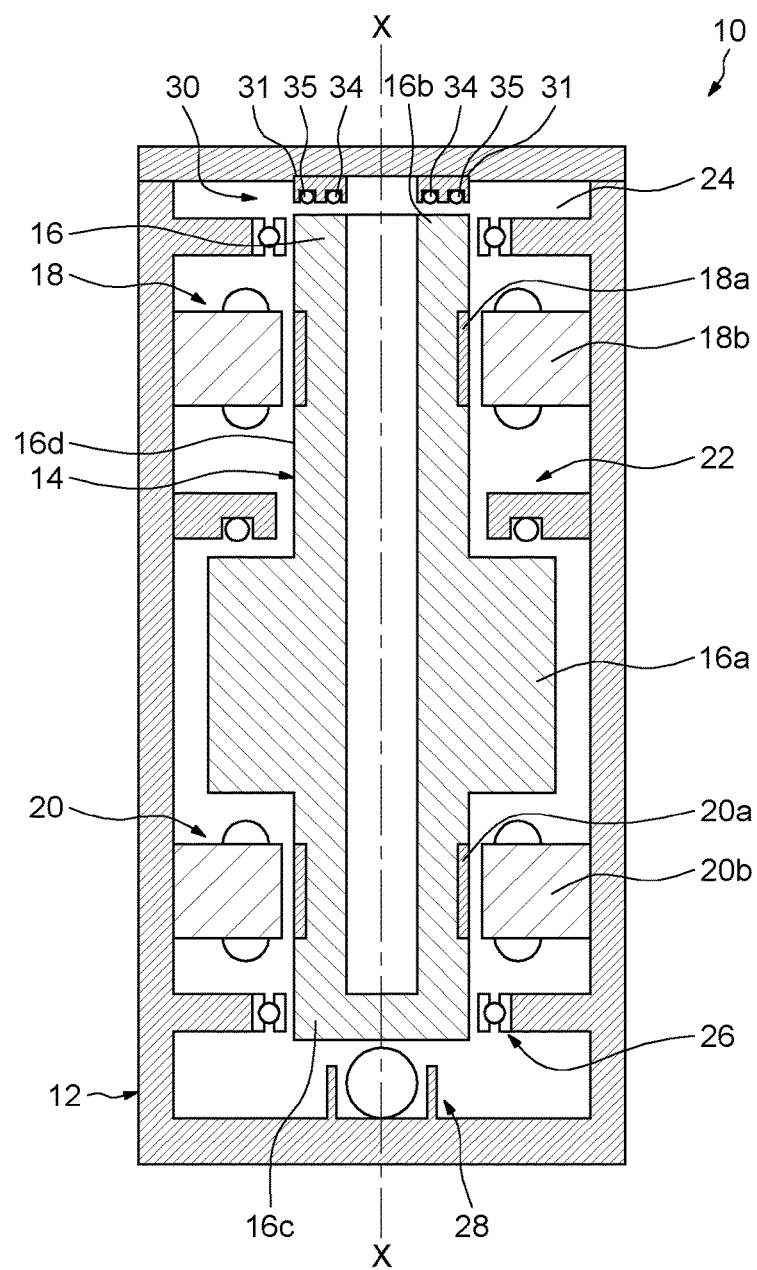
FIG. 1 is an axial half-section view of a rotary machine having a device for detecting the axial position of a rotor shaft according to the present invention.

A rotary machine 10 is illustrated on FIG. 1; the rotary machine 10 may for example be a high speed flywheel, or any high speed rotary machine having a vertical rotor arrangement.

The rotary machine 10 provides a stator 12 and a rotor 14 having a rotor shaft 16 rotating around a vertical axis X-X.

The rotor shaft 16 of the rotor 14 is supported rotatably with respect to the stator 12 by an active magnetic bearing system comprising two radial magnetic bearings 18, 20, respectively an upper radial magnetic bearing 18 and a lower radial magnetic bearing 20, and by an axial actuator 22 secured to the stator 12 and configured to produce an axial attractive force on a shoulder 16a of the shaft 16 of the rotor 14 projecting radially towards the stator 12.

The two radial magnetic bearings 18, 20 may be identical and arranged at opposite ends 16b, 16c of the rotor shaft 16. The rotor shaft 16 may be made of ferrite material.

The rotor shaft 16 of the rotor 14 is further supported rotatably with respect to the stator 12 by an upper radial touch down bearing 24 and by lower radial and axial touch down bearings 26, 28. The touch down bearings are, for example, mechanical auxiliary bearings adapted to support the rotor in case of failure of the magnetic bearings.

Each radial magnetic bearing 18, 20 provides an annular armature 18a, 20a made of ferromagnetic material mounted on an outer cylindrical surface 16d of the rotor shaft 16 and a stator armature 18b, 20b secured to the stator 12. The stator armatures 18b, 20b each provides, in a conventional manner, a stator magnetic circuit having one or more annular coils and ferromagnetic body and are placed facing the rotor armature 18a, 20a so as to define a radial airgap. The details of the stator armatures are not shown on the Figures. Thanks to the active magnetic bearing system, the rotor 14 rotates without mechanical contact within the stator 12.

Figure 2:
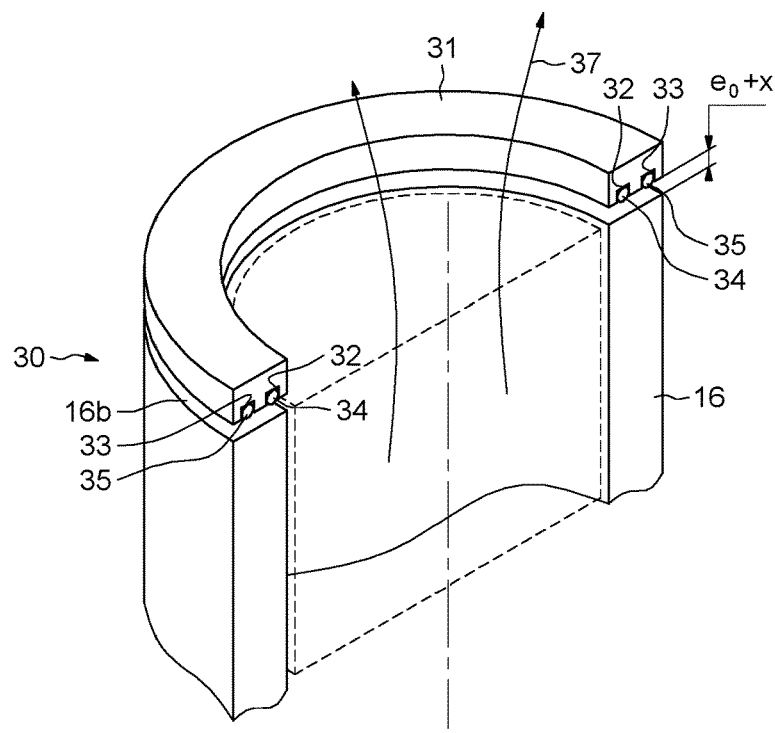
FIG. 2 is a perspective view of a part of the axial detecting device of FIG. 1.

As illustrated on FIGS. 1 and 2, the rotor shaft 16 is hollow in this example.

Figure 3:
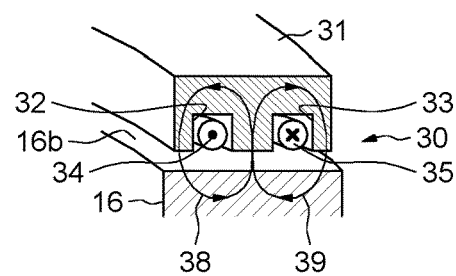
FIG. 3 is a detail view of the axial detecting device of FIG. 2.

As illustrated on FIGS. 1 to 3, the rotary machine 10 further provides a device 30 for detecting the axial position of the rotor shaft 14. Such device will be called "axial sensor".

The axial sensor 30 provides a sensor stator ring 31 facing one end 16b of the rotor shaft 16 and is arranged in a stationary manner so as to leave an axial airgap e0+x with one end 16b of the rotor shaft 16.

The sensor stator ring 31 is made from ferromagnetic material, such as for example compressed iron powder or ferrite material. The sensor stator ring 31 is symmetrical with respect to the plane of symmetry of the rotor 14. The sensor stator ring 31 has an E-shape cross section defining two parallel annular slots 32, 33, located on the same radial plane. Each annular slot 32, 33 is configured to receive an annular induction coil 34, 35. The sensor stator ring 31 acts as a magnetic circuit and is secured to the stator 12.

Figure 4:
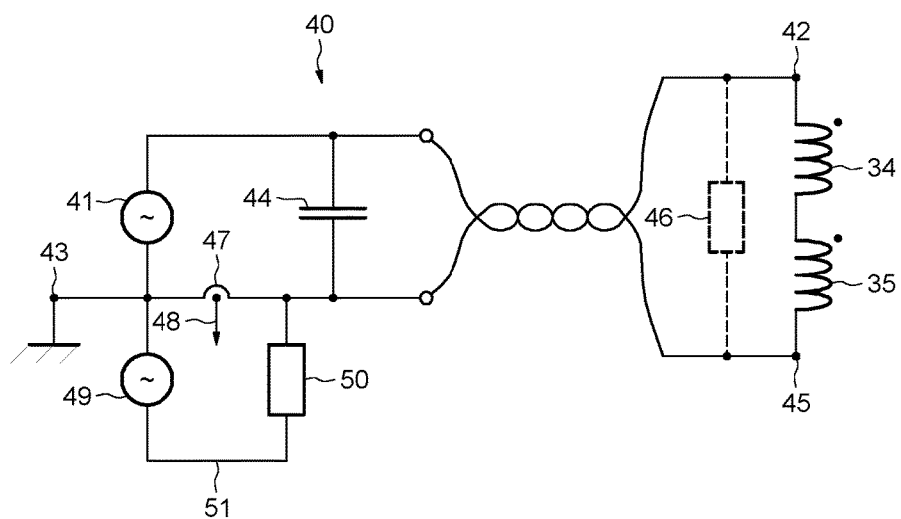
FIG. 4 is an electrical circuit of the power supply and measurement circuits associated with the detecting device.

The annular induction coils 34, 35 are electrically connected in series, as can be seen on FIG. 4. The coil winding sense is opposite thus any disturbing flux coming from the environment (FIG. 2, 37) does not induce any voltage at the serial connected coils of the sensor stator ring 31.

The shaft 16 of the rotor 14 is made from solid magnetic steel. The end 16b of the shaft acts as a target surface whose axial position is to be measured by the axial detector. The sensor stator ring can thus directly sense the axial position of the end of the rotor shaft, without using any additional target. Thanks to the two coils 34, 35, the magnetic excitation flux is concentrated towards the target surface 16b of the rotor shaft.

As illustrated on FIG. 3, the resulting excitation flux path 38, 39 is associated to each annular coil 34, 35.

In other words, the axial sensor 30 is an inductive axial shaft position sensor sensing on the shoulder of a shaft with a larger diameter.

FIG. 4 shows an embodiment of a circuit 40 for powering the two induction coils 32, 34.

As illustrated on FIG. 4, the electrical circuit 40 provides a first AC voltage source 41, having for example a simple oscillator without a transformer connected to a first end 42 of the set of coils 34, 35 connected in series, and at point 43 located at a reference voltage, such as ground. The electrical circuit 40 further provides a capacitor 44 connected in parallel to the set of coils 34, 35, to the first and second end 42, 45 of the set of coils 34, 35. The resistor 46 represents the losses induced in the solid target 16b by the alternative excitation flux.

An AC current detector device 47 is arranged between the second end 45 of the set of coils and the ground 43. The sensed AC current represents the value of a modification x in the width of the airgap e0. The resistive current of loss resistor 46 is superposed to the sensed AC current 48.

As illustrated on FIG. 4, the electrical circuit 40 further provides an optional second AC voltage source 49 and an optional first resistor 50 connected in series on a line 51. The line 51 is connected in parallel to the AC current detector device 47. If necessary, the second AC voltage source 49 and the first resistor 50 allow compensating the resistive current due to rotor iron losses. In the proposed current sensing concept a phase sensitive circuit is used which detects only inductive or capacitive current components, so that the resistive loss current does not disturb the result. However, the amplitude of the resistive current due to losses could be bigger than the inductive or capacitive currents containing the position information and to avoid saturation effects in the measurement circuitry the optional second AC voltage source 49 and the optional first resistor 50 can be advantageously used.

Thanks to the present invention, the axial position of the rotor shaft is sense directly on the solid magnetic steel rotor shaft, without using an additional target.

The axial sensor of the present invention allows a free access to the center of large rotor shafts, having a diameter for example more than 50 mm.

Thanks to the short axial length of the axial sensor, the rotary machine is more compact.

Such axial sensor is not disturbed by external magnetic fields and there are no rotational harmonics in the sensor signal.

Finally, the quality of the sensor signal is not affected by the quality of the rotor target surface.

The invention claimed is:

1. A device for detecting the axial position of a rotor shaft of a rotary machine having a stator and a rotor having a rotational axis, comprising:
 a sensor stator ring, secured to the stator, made from ferromagnetic material, facing an outer axial end of the rotor shaft and arranged so as to leave an axial airgap with the outer axial end of the rotor shaft, the sensor stator ring having at least two annular slots receiving an annular induction coil; wherein the annular induction coil comprising a set of induction coils connected in series, the rotor shaft is made from solid magnetic steel, such that the outer axial end of the rotor shaft acts as a target surface whose axial position is to be measured by the sensor stator ring, the outer axial end being formed by a radially extending axial surface, the radially extending axial surface being annular when viewed along the rotational axis such that a central hollow is defined thereby, the sensor stator ring and the annular induction coil being radially aligned with the outer axial end such that movement of the rotor shaft axially past the sensor stator ring is prevented, the annular induction coil being in facing opposition with the outer axial end such that the annular induction coil senses the axial position of the outer axial end of the rotor shaft without any additional target; and an electrical circuit for powering the annular induction coil, the electrical circuit comprising a first AC voltage source connected to a first end of the annular induction coil, and at a point located at a reference voltage, and a capacitor connected in parallel to the annular induction coil, to the first and second end of the annular induction coil, and an AC current detector device arranged between the second end of the annular induction coil and the reference voltage to deliver information about the magnitude of the current flowing between the second end of the annular induction coil and the reference voltage, the information representing the value of a modification in the length of the airgap.

2. The device according to claim 1, wherein the reference voltage is ground.

3. A device for detecting the axial position of a rotor shaft of a rotary machine having a stator and a rotor having a rotational axis, comprising:

a sensor stator ring, secured to the stator, made from ferromagnetic material, facing one end of the rotor shaft and arranged so as to leave an axial airgap with the one end of the rotor shaft, the sensor stator ring having at least two annular slots receiving an annular induction coil; wherein the annular induction coil comprising a set of induction coils connected in series the rotor shaft is made from solid magnetic steel, such that an end of the rotor shaft acts as a target surface whose axial position is to be measured by the sensor stator ring, and an electrical circuit for powering the annular induction coil, the electrical circuit comprising:
  a first AC voltage source connected to a first end of the annular induction coil and at a point located at a reference voltage,
  a capacitor connected in parallel to the annular induction coil,
  an AC current detector device arranged between a second end of the annular induction coil and the reference voltage delivers information about the magnitude of the current flowing between the second end of the annular induction coil and the reference voltage, the information representing the value of a modification in the length of the airgap, and
  a second AC voltage source and a first resistor connected in series on a line connected in parallel to the AC current detector device.

4. The device according to claim 3, wherein the sensor stator ring is made from compressed iron powder.

5. The device according to claim 3, wherein the sensor stator ring is made from ferrite material.

6. The device according to claim 3, wherein the rotor shaft is made from ferrite material.

7. A rotary machine comprising:
  the rotor shaft rotating around a vertical axis and supported in the stator by at least two radial magnetic bearings, and
  the device of claim 3 for detecting the axial position of the rotor shaft.

8. The rotary machine according to claim 7, further comprising an axial actuator secured to the stator and configured to produce an axial attractive force on a shoulder of the rotor shaft, the shoulder projecting radially towards the stator.

9. The rotary machine according to claim 7, further comprising an upper radial touch down bearing and lower radial and axial touch down bearings.

* * * * *